United States Patent
Wells et al.

(10) Patent No.: US 7,388,859 B2
(45) Date of Patent: Jun. 17, 2008

(54) TELEPHONE HAVING AN INTEGRATED HIGH SPEED CONNECTION AND DATA TRANSFER SYSTEM COMPRISING SAME

(75) Inventors: Emily J. Wells, Elk Point, SD (US);
Brian L. Wells, Elk Point, SD (US);
Wayne M. Pruchniak, Jefferson, SD (US)

(73) Assignee: Gateway Inc., Irvine, CA (US)

( * ) Notice: Subject to any disclaimer, the term of this patent is extended or adjusted under 35 U.S.C. 154(b) by 1100 days.

(21) Appl. No.: 10/404,642

(22) Filed: Apr. 1, 2003

(65) Prior Publication Data

US 2004/0196828 A1 Oct. 7, 2004

(51) Int. Cl.
*H04L 12/66* (2006.01)
(52) U.S. Cl. ............... 370/352; 379/93.22; 379/144.05
(58) Field of Classification Search ................ 370/352; 379/93.12, 110.01, 143, 144.05, 144.08, 93.22, 379/93.17, 90.01, 91.01; 348/211.1, 211.3
See application file for complete search history.

(56) References Cited

U.S. PATENT DOCUMENTS

| | | | |
|---|---|---|---|
| 6,314,169 B1 * | 11/2001 | Schelberg, Jr. et al. | 379/93.12 |
| 6,688,518 B1 * | 2/2004 | Valencia et al. | 235/379 |
| 2002/0078160 A1 * | 6/2002 | Kemp et al. | 709/208 |
| 2002/0116278 A1 * | 8/2002 | Meyer et al. | 705/26 |
| 2004/0072540 A1 * | 4/2004 | Wilson et al. | 455/550.1 |
| 2004/0201688 A1 * | 10/2004 | Wolf et al. | 348/207.1 |

* cited by examiner

*Primary Examiner*—Stella L Woo
(74) *Attorney, Agent, or Firm*—Ross F. Hunt, Jr.; Douglas E. Jackson; Stites & Harbison, PLLC

(57) ABSTRACT

A public telephone device includes a high speed data connection controller for communicating with an attached peripheral such as a digital camera. The high speed data connection controller is electrically connected to the telephone controller. A high speed data connection hub also provides connectivity to the attached peripheral via a high speed data connection, the high speed data connection hub being electrically connected to the high speed data connection controller. The high speed data connection is accessible through an outer housing of the telephone device such that data is capable of being transferred from the attached peripheral via the high speed data connection hub and the high speed data connection controller over the telephone network.

3 Claims, 6 Drawing Sheets

TELEPHONE HAVING AN INTEGRATED HIGH SPEED CONNECTION AND DATA TRANSFER SYSTEM COMPRISING SAME

FIELD OF THE INVENTION

This invention relates to storage intensive digital appliances such as digital cameras, and to public telephones such as phone booths.

BACKGROUND OF THE INVENTION

When traveling, many tourists like to take pictures of where they go. In the past, the only means that could be used to take pictures were traditional photographic cameras or video cameras.

Today, many individuals own digital cameras. Generally, digital cameras can either have the pictures stored on a floppy disk or in the memory of the camera, and such cameras generally operate as follows: Once the memory or disk becomes full, no new information or pictures can be stored. In order to be able to store new information, the disk or the memory needs to be replaced or cleared. In order to clear the memory or disk, the pictures stored therein need to be offloaded to a computer. This means that a person who is vacationing and has a digital camera often needs to bring a computer with them so that once the camera's memory or disk is full, he or she will be able to offload the pictures and then be able to take more pictures with the camera. Alternatively, individuals must buy additional disks or memory to replace the full disk or memory. Otherwise, once the camera's memory becomes full, no more pictures can be taken.

Sometimes individuals prefer to back-up data as opposed to erasing it. When using a digital camera, the user may desire to copy, or upload, the pictures but not erase them from the camera's disk or memory. Again, a vacationer would have to bring a computer with him or her to be able to upload the pictures.

SUMMARY

The present inventors recognized that it would be advantageous to have a means of uploading or offloading the pictures from the camera's memory or disk without having to bring a computer or memory device along with the camera when vacationing or otherwise away from access to one's computer. It would also be advantageous to have this means of uploading or offloading the pictures be readily available to tourists, for instance, in public areas. Furthermore, it would be advantageous to have this means of uploading or offloading the pictures be very simple and easy to use as well.

In accordance with the present invention, a telephone with a high speed connection is disclosed. The telephone device includes a housing. A telephone controller is located within the housing for connecting the telephone device with a telephone network. A user interface is disposed on the housing for receiving input from a user and is electrically connected to the telephone controller. A speech transmission module is provided for transmitting the user's voice over the telephone network. The speech transmission module is electrically connected to a speaker interface, a user handset, and the telephone controller. A high speed data connection controller is provided for communicating with an attached peripheral. The high speed data connection controller is electrically connected to the telephone controller. A high speed data connection hub also provides connectivity to the attached peripheral via a high speed data connection, the high speed data connection hub being electrically connected to the high speed data connection controller. The high speed data connection is accessible through the outer housing of the telephone device such that data is capable of being transferred from the attached peripheral via the high speed data connection hub and the high speed data connection controller over the telephone network.

In one form of the invention, a payment collection means operatively is connected to the telephone controller for receiving payment from the user. The payment collection means may comprise one or more of a credit card reader, a debit card reader, a keypad for accepting entry of a credit or debit card number, or the like. The payment collection means may also, or may alternatively, comprise a cash acceptance means including one or both of a coin interface (e.g., a coin slot for accepting coins) or a currency slot (e.g., for accepting dollar bills).

In another form of the invention a visual display is provided for displaying output to the user. The visual display is electrically connected to the telephone controller. The visual display may take the form of an LCD display or other like type of display.

In one preferred form of the invention, the high speed data connection is a USB connection, and the high speed data connection controller comprises a USB controller and programming adapted to communicate in accordance with the USB specification when the attached peripheral comprises a USB enabled data storage peripheral. The programming may be adapted to communicate with the attached peripheral when in the form of a digital camera having the data stored therein.

Additionally, the user interface is capable of receiving input from the user to effect the transfer of data from the attached peripheral over the telephone network.

BRIEF DESCRIPTION OF THE DRAWINGS

In the drawings, which are discussed below, one or more preferred embodiments are illustrated, with the same reference numerals referring to the same pieces of the invention throughout the drawings. It is understood that the invention is not limited to the preferred embodiment depicted in the drawings herein, but rather it is defined by the claims appended hereto and equivalent structures.

DETAILED DESCRIPTION OF THE PREFERRED EMBODIMENTS

While the specification concludes with claims particularly pointing out and distinctly claiming the subject matter which is regarded as the invention, the invention will now be further described by reference to the following detailed description of preferred embodiments taken in conjunction with the above-described accompanying drawings.

Figure 1:
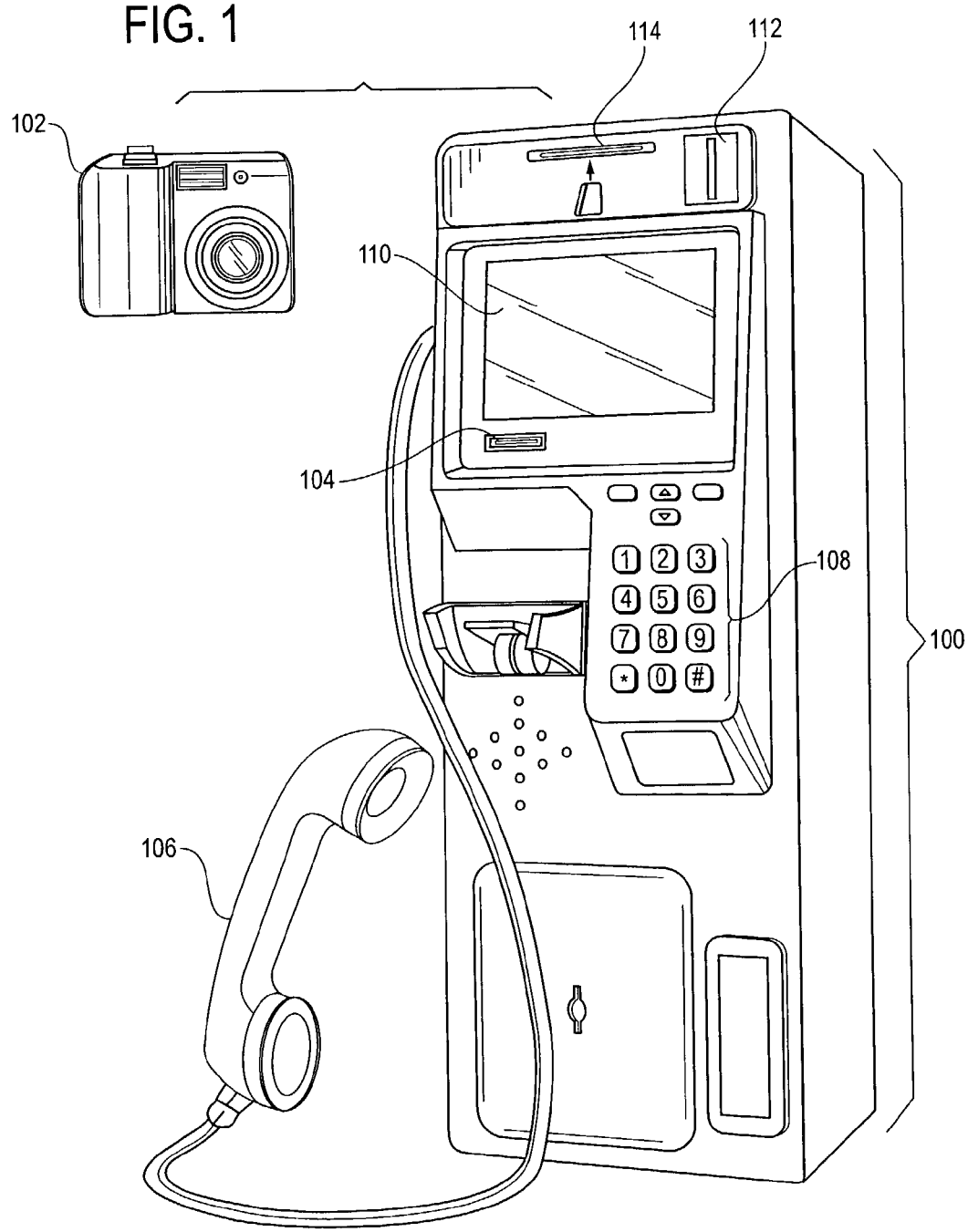
FIG. 1 is a schematic view of a telephone device having a high speed data connection for use with a digital peripheral in accordance with one embodiment of the present invention.

In FIGS. 1-6, there is shown a form of a telephone device 100 in accordance with the present invention and which is presently preferred. Referring now to FIG. 1, the telephone device 100 includes a high speed data connection 104, such as the USB port shown. It should be understood that the high speed data connection can be any suitable port similar to the USB port, such as an IEEE-1394 port or the like.

The USB port 104 is shown located on the front of the telephone device 100 housing; however it should be understood that it can be located anywhere on the telephone device 100 that is convenient to the user. The telephone device 100 may also include other typical telephone related features, such as a handset 106, a keypad 108, and an optional visual display 110, such as an LCD display.

The telephone device 100 of FIG. 1 is in the form of a pay telephone and includes features to effect the collection of payment, such as a coin deposit slot 112, an electromagnetic card reader (or currency slot) 114, or means for receiving a credit card number, or the like.

In FIG. 1, there is also shown a data storing and transferring device 102, such as a USB enabled digital camera for use with the telephone device 100 or the like. In some embodiments the peripheral is a slave device that obeys a defined protocol, such as a USB enabled device. The peripheral reacts to request transactions sent from its host. The peripheral also responds to control transactions that request detailed information about the peripheral. The peripheral sends and receives data between the host using a standard data format, such as the USB data format.

Figure 2:
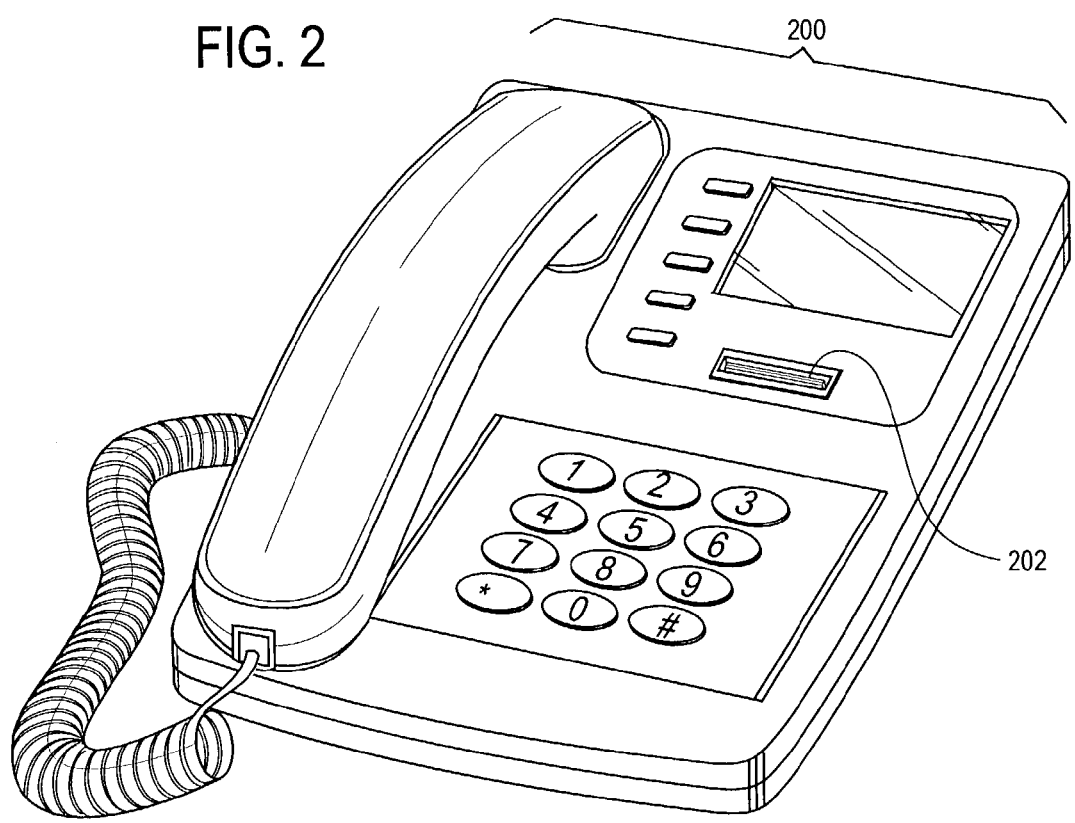
FIG. 2 is a schematic view of a telephone device having a high speed data connection for use with a digital peripheral in accordance with a second embodiment of the present invention.

FIG. 2 shows an alternative preferred embodiment of the present invention, namely telephone device 200, which can be an analog or digital non-payphone, having a high speed data port 202, such as a USB port.

Figure 3:
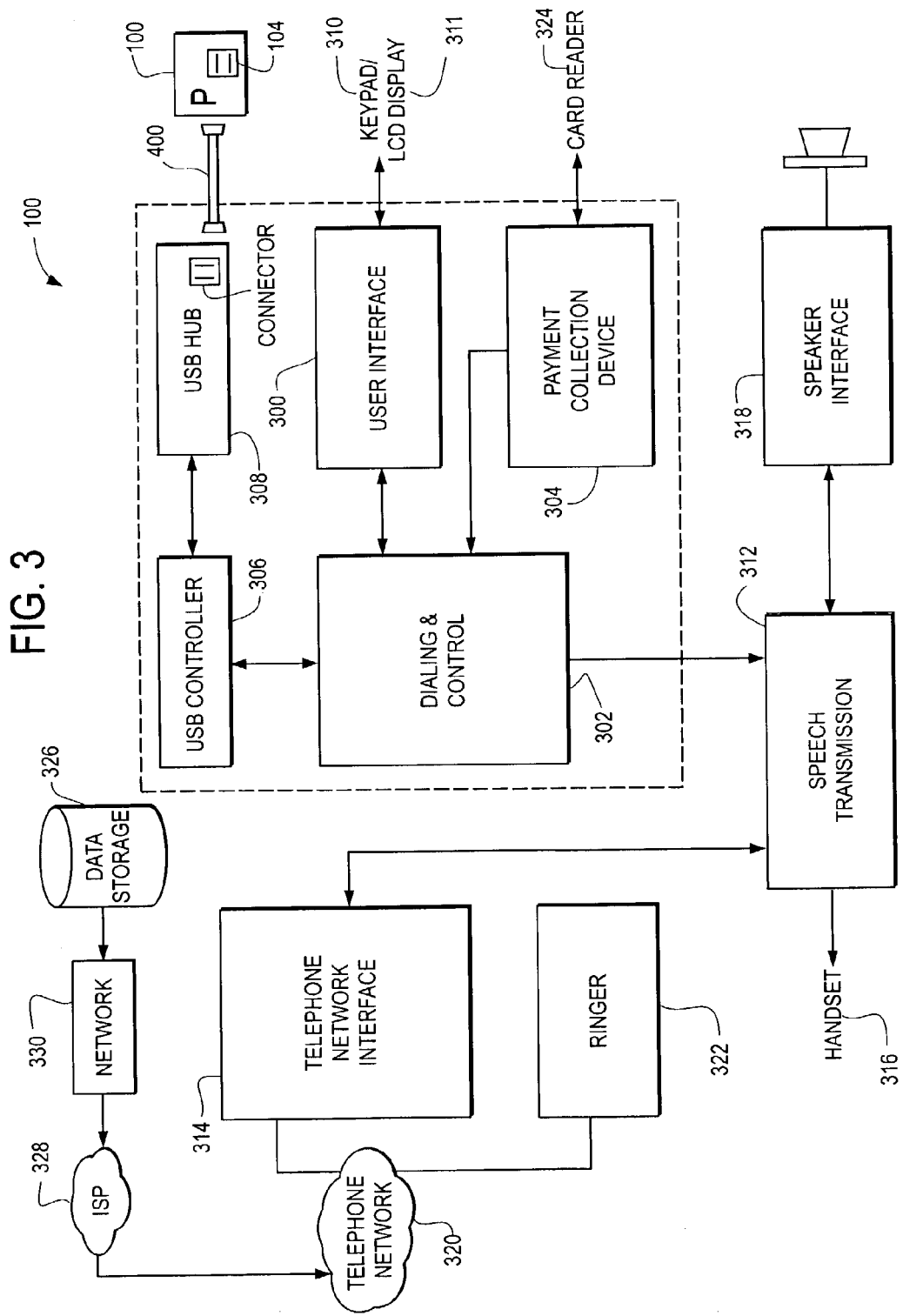
FIG. 3 is a schematic view of the internal operating components of the telephone device of the present invention.

Turning now to FIG. 3, a schematic diagram of the telephone device 100 is depicted. For simplicity, the schematic diagram is directed to a USB port embodiment and its connections to the operating components of the telephone.

The internal operating components include a user interface module 300 and a dialing and control module 302. For the payphone embodiment, the internal operating components also include an optional payment collection device 304, such as a card reader interface, a currency slot, or a coin interface. In the case of the card reader interface, a card reader 324 may be included in operative connection with the card reader interface in a manner known in the art. For the non-payphone embodiment 200, the payment collection device 304 may be excluded.

Electrically connected to dialing and control module 302 is a high speed data controller 306, such as a USB controller. The USB controller includes suitable hardware and software for managing the dynamic attachment and detachment, and the enumeration of, USB enabled peripherals. The USB controller communicates with the attached peripheral to discover the ID of its device driver and loads the appropriate driver as and if necessary. A unique address is assigned to the attached peripheral during the enumeration step to be used for run time data transfers. The USB controller also initiates transfers to the attached peripheral and the peripheral accepts transactions intended for it and responds appropriately.

A high speed data hub 308, such as a USB hub, is also provided and is in electrical connection with the high speed data controller 306. The USB hub provides connectivity and managed power to the attached peripherals. During run time the hub acts as a bi-directional repeater and is capable of repeating USB signals as required. The hub also monitors signals and handles transactions addressed to it. Other signals are repeated to the attached peripheral.

The user interface 300 is electrically connected to a suitable input device 310, such as a keypad, and may include an electrical connection to a suitable user visual output device 311, such as the LCD display 310. Both the user interface module 300 and the payment collection device 304 are connected to the dialing and control module as is known in the art.

The dialing and control module 302 is also connected to a speech transmission module 312 in a conventional manner. In turn, the dialing and control module 302 is connected to a telephone network interface 314.

The speech transmission module 312 is also connected to both a user handset 316 and a speaker interface 318 as is known in the art. The telephone network interface 314 may be a conventional analog telephone line interface, either high or low voltage, which is connected to a telephone network 320 (e.g., the PSTN) and a ringer 322. In this configuration, the telephone device 100 could supply power to the USB hub 308. It should also be understood that other types of telephone network interfaces also fall within the scope of the present invention, such as digital interfaces, PBXs, satellite interfaces, cellular interfaces, voice over IP interfaces, and the like. Embodiments of the present invention having a wireless interface are useful for providing high speed data connection to a remote location, or a place which has limited or unreliable communications access, such as a cruise ship, an airplane, or a resort community in a remote region.

A remote data store 326 is in communication with the telephone network connection 320 for storing data transferred from, and possibly to, the telephone device 100. This communication can be a direct connection, such as via a BBS type system. However, more typically the connection takes place via a computer network, such as a LAN, WAN, Internet, or other global computer network using conventional protocols and routing. The embodiment shown depicts a connection via the Internet.

For a typical Internet connection, the telephone device 100 accesses the Internet Network 330 via an Internet Service Provider (ISP) 328 which is accessed via the telephone network 320. The data store 326 is also accessible via the Internet Network 330 such that data may be transferred between the telephone device 100 and the data store 326.

Figure 4:
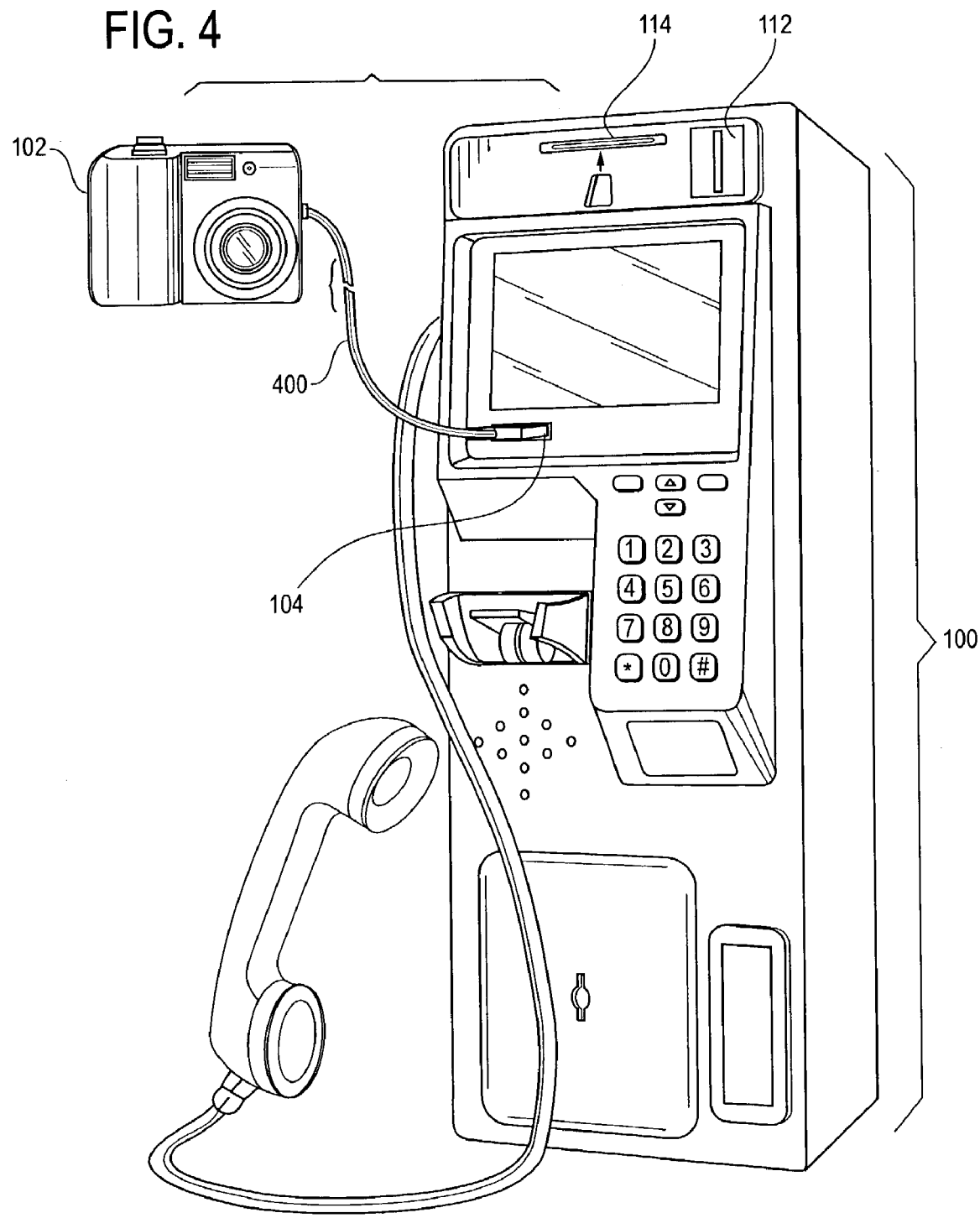
FIG. 4 shows a digital peripheral connected to the high speed connection of the telephone device of FIG. 1.

As best seen in FIG. 4, by having the USB port 104 integrated into the telephone device 100, users who may be traveling are able to connect a data storing peripheral 102, such as a digital camera or other digital peripheral, to the telephone device 100 via a suitable cable or connector 400, such as a USB cable, to effect a transfer of data. In a similar manner, a digital camera or other digital peripheral can be connected to the phone 200 via a suitable cable or connector, not shown. When the data storing peripheral 102 is connected to the high speed data port 104, the traveler may upload or offload data, such as digital graphics or picture files, through a transfer service as discussed in greater detail below. Moreover, a high-speed connection may be employed to transfer the data from the data storing peripheral 102, such as the digital cameral, by utilizing the latest version of the USB specification.

In one embodiment, for an individual to be able to use the telephone device 100 having a USB port 102, the user should have previously registered for a transfer service that is used to upload or offload the data. The transfer service is preferably an Internet enabled or accessible service account. Once the user creates the account, the user may then transfer data, such as the upload or offload of digital pictures, using the telephone device 100. Alternatively, in another embodiment, the user is able to register for the service by calling the service via the telephone device 100 or a conventional telephone and following voice prompts and entering appropriate inputs in response thereto to effect the registration. Once the account is created the user may use the transfer service as described above. Other variations to the transfer service are able to be devised to accomplish the upload or offload of digital data in a high-speed manner through a telephone system, including, for example, the use of any number of subscriber-based services, on-demand systems, or through application service providers, as well as by means of non-web based services.

Figure 5:
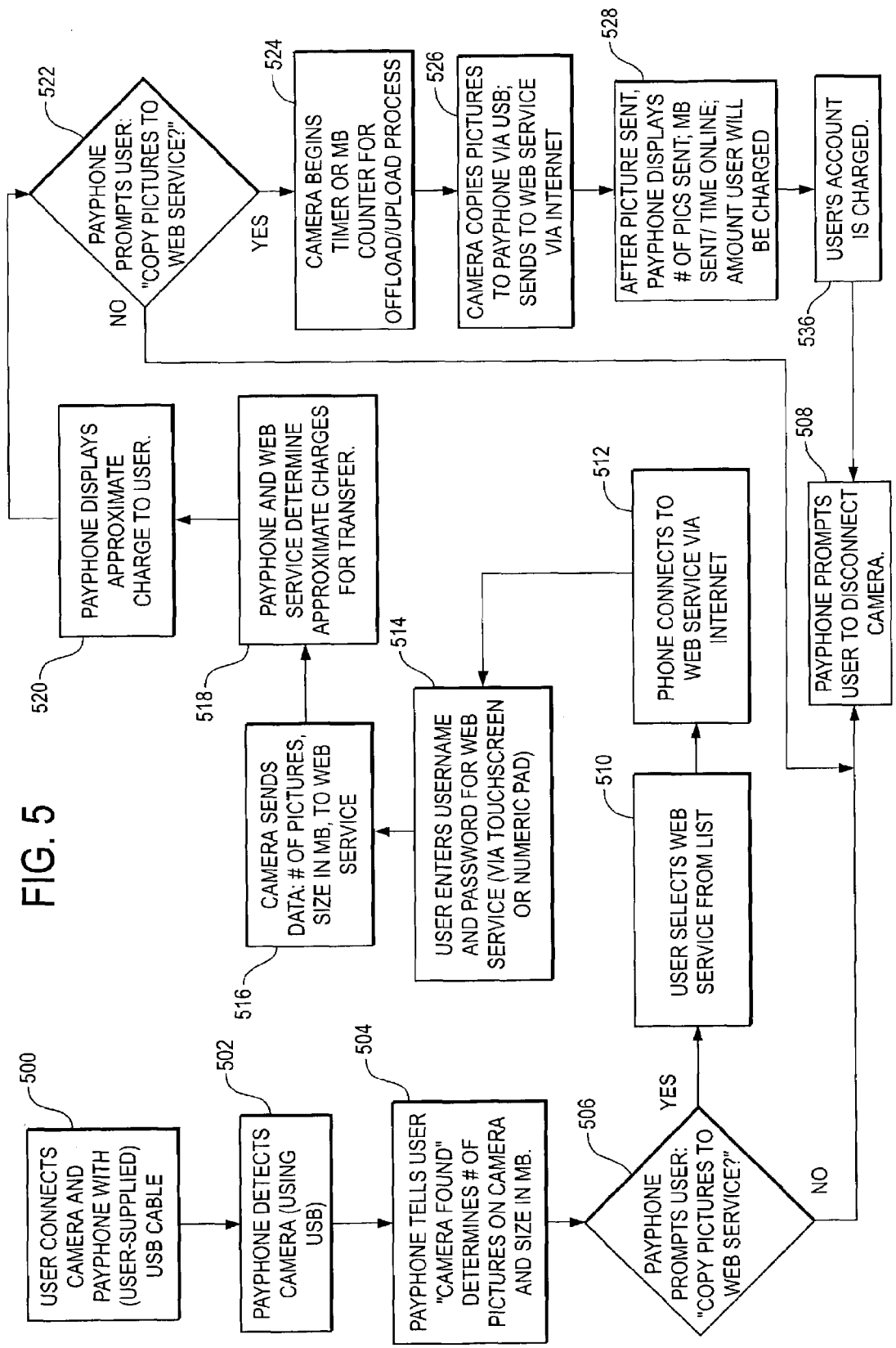
FIG. 5 is a flow-chart for the telephone device of FIG. 1.

Turning now to FIG. 5, a schematic diagram of one suitable transfer service is depicted; in a first step 500, the user connects the peripheral 102 to the telephone device 100 through a suitable USB cable 400 that can either be user-supplied or provided at the phone by means of a connector. Although USB is one preferred embodiment, other embodiments may use wired connectors which support other protocols such as VSB, VME, IEEE-1394, RS-233, RS-422, parallel port, PS/2 port, DIN 41612, mini DIN, Infiniband, IRDA, Ethernet, PCI Express, Centronix, or $I^2C$, DDC-26; or wireless protocols such as GPRS, Bluetooth, or 802.11 (b,a or g).

Suitable programming located in the telephone device 100 exists to perform the following operations. In step 502, once connected to the USB port 102, the telephone device 100 detects the peripheral 102 according to the defined protocol.

In step 504, the telephone device 100 informs the user that the peripheral has been located by the USB controller 306 and determines the number of data files stored on the peripheral 102 via a preselected algorithm and protocol. In addition, the size of the data files may also be transmitted. For example, in the case of a digital camera, the size of the picture files would be given in megabytes. The telephone device 100 informs the user of the information retrieved from the peripheral 102, either through the visual display 110 or through the speaker 318, located on the handset, the telephone device itself, or located separately.

In step 506, the telephone device 100 then prompts the user as to whether the data contained on the peripheral should be uploaded or offloaded to the remote data store 326 by means of the web service in this embodiment. If the user does not wish to upload or offload the data to the web service at this time, the telephone instructs the user to disconnect the camera in step 508.

In step 510, if the user instructs the telephone device 100 to upload or offload the data from the peripheral to the web service, the user instructs the telephone device 100 to connect to the web service having his user account. This step can be performed either by selecting a list through an automated system wherein the user selects the service by entering a certain code or number using the keypad 108 of the telephone device 100, by entering the number or code on the keypad 108 in accordance with a list that appears on the visual display 110 of the telephone device 100, inputting a voice response, or the like.

In step 512, after the user selects the web service to use, the telephone device 100 connects to the web service preferably via the Internet. In step 514, once connected to the web service, the user enters his username and password to verify his identity, preferably via a touchscreen, numeric pad, keypad 108, or the like. If the user has not previously set up an account, the user may be given the opportunity to create an account, for example, using a touchscreen, numeric pad, keypad 108, or the like. In step 516, once the username and password have been accepted by the web service, the camera transmits the data files, the number of files, and the size of the files, such as in megabytes, to the web service in a manner known to those skilled in the art.

There are two alternatives that can be implemented at this point in the inventive service. In the embodiment of FIG. 5, in step 518 the web service determines the approximate charge for the transfer of the data based on the number of files and the size of the files. The telephone device 100 then displays the approximate charge to the user either by displaying this information on the visual display 110 or the speaker 318 in step 520.

In step 522, the telephone device 100 prompts the user to copy files to the web service. If the user answers no, the telephone device 100 prompts the user to disconnect the peripheral in step 508. If the user answers yes, the user selects whether to transmit the files, by uploading or offloading, and then the peripheral 102 begins a timer routine or data counter for the upload transmitting process in step 524. In step 526, the peripheral 102 copies pictures to the telephone device 100 through the high speed data interface 104 and sends the transferred data to the web service via the Internet, as per step 526. After the data is sent, in step 528 the telephone device 100 displays the number of files sent, the size of the files (in megabytes), the amount of time connected to the service or online, and/or the amount the user will be charged. Finally, in step 530, the service charges the user's account and the telephone device 100 prompts the user to disconnect the peripheral 102.

Figure 6:
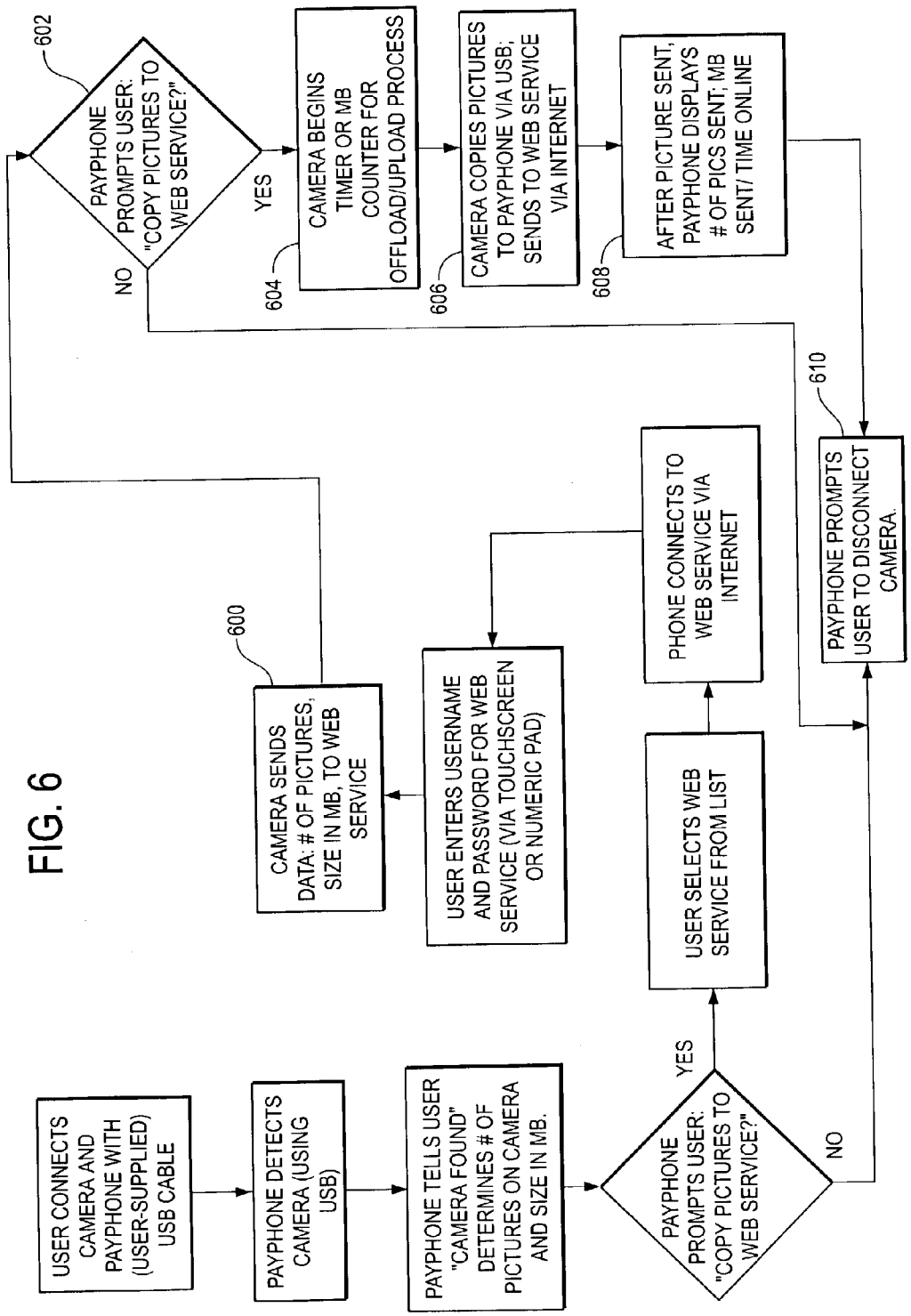
FIG. 6 is a flow-chart for the telephone device of FIG. 2.

In a second embodiment of the invention, depicted in FIG. 6, there is no charge for accessing the service like in the embodiment of FIG. 5. Thus, in step 602, after the peripheral 102 transfers the information pertaining to the data, such as the number of pictures and the size of the data files in megabytes to the web service, the telephone device 100 prompts the user to copy data files to the web service. In step 604, when the user instructs the service to proceed and selects whether to upload or offload the pictures, the peripheral 102 begins the timer routine or data size counter for the upload or offload process. In step 606, the data files are then uploaded or offloaded to the web service. In step 608, after the data files are uploaded or offloaded, the telephone device 100 displays the number of data files sent, the size of the data transferred and/or the time connected to the service or online. Finally in step 610, the telephone device 100 prompts the user to disconnect the camera.

In one preferred aspect of the invention, different levels of service may be associated with each embodiment. A basic level service could be a free service that displays advertisements on the user's display when the pictures are downloaded from the service to the user's computer. A top-level service could be a fee-based service that is advertisement-free. Additionally, the free service may also have more compression and smaller maximum file size requirements (resulting in lower-quality images) while the fee-based service may have larger compression allowances and larger maximum file transfer sizes (resulting in higher-quality images). Levels of service between the top-level and basic level are also contemplated in the present invention. For example, differences between service levels may be defined by the amount of storage space available on which the user can store data. In one exemplary embodiment, a free service may only allow enough space to store a few pictures, while a pay service may allow much more space so that many pictures can be stored.

Of course, when the data stored on a digital peripheral is uploaded and not offloaded, the data remains in the peripheral's memory or data storage. Nonetheless, after the data files are "uploaded" to the web service, the peripheral's memory or data storage for storing the data files may be erased or over-written, which means that memory for data storage is, in a sense, freed-up. The user is then able to refill the peripheral's memory, such as by taking more digital pictures, and not have to worry about offloading the data again to free the memory or data storage. Then, once full again, the user may again use the service to free up the card.

Another aspect of the present invention allows the user the ability to retrieve the date files stored on the remote data store 326 by accessing the data store via any suitable means, such as via the Internet using a personal computer at a later time, such as when the user returns home from vacation.

Exemplary embodiments of the invention, such as the telephone device 100 which includes high speed data connection 104, may be configured in phone booths and other public pay phones or telephone devices located in public areas such as airports, common areas of private businesses, gas stations, museums, sports arenas, shopping malls, and the like. Aside from being located in public areas, public pay phones are typically configured with a payment collection means for accepting immediate payment for a particular usage (e.g., a particular telephone call, or as here, a particular instance of transferring data). Immediate payment takes place either immediately prior to, during or immediately following the telephone call or transfer of data.

Although the invention has been described in terms of a high speed data connection for downloading data from a digital camera, the invention can also be used to provide connectivity other attached peripherals such as USB Flash drives, portable MP3 players, personal digital assistants (PDAs), or the like. Hence, the present invention may be embodied in other specific forms without departing from the inventive essence enabled in this specification, including the essential attributes of the present invention. Accordingly, reference should be made to the appended claims, rather than to the foregoing specification, as indicating the scope of the invention.

What is claimed is:

1. A system for transferring data from a digital peripheral to a data store using a telephone, the system comprising:

a telephone device having a user interface and a USB connection, the USB connection comprising a USB hub having a USB data port, a USB controller and programming adapted to communicate in accordance with the USB specification, the telephone device being connected to a telephone network;

a digital camera in communication with telephone device through a cable connecting the digital camera to the USB data port;

a data transfer service having a remote data store, the data transfer service being in communication with said telephone device through said telephone network;

wherein said telephone device:
   detects that said digital camera is connected;
   determines the number and size of data files stored on said digital camera;
   displays a plurality of permissible data transfer services from which a user may select;
   receives a selection from the user of one of said plurality of data transfer services to effect the transfer of data;
   transmits the number and size of the data files stored on said digital camera to said data transfer service;
   displays an approximate charge for a transfer of said data files to said data transfer service in response to receiving said approximate charge from said data transfer service; and
   transfers said data files to said data transfer service in response to receiving a confirmation from a user through said user interface;

wherein said data transfer service:
   determines said approximate charge for said transfer of said data files based on the number and size of the data files; and
   receives and stores said data files in said remote data store.

2. The system for transferring data according to claim 1, wherein the telephone device further comprises means for uploading the data from the digital camera to the data store.

3. The system for transferring data according to claim 1, wherein the telephone device further comprises means for offloading the data from the digital camera to the data store.

* * * * *